United States Patent
Parker et al.

[11] Patent Number: 5,992,450
[45] Date of Patent: Nov. 30, 1999

[54] CARTRIDGE VALVE HAVING SOLENOID BYPASS AND INTEGRAL RELIEF VALVE

[75] Inventors: Scott M. Parker, Victoria, Minn.; Rodney V. Singh, Richmond Heights, Ohio; Terence J. Bigaouette, Cologne, Minn.; Gregory F. Lantsberg, Chaska, Minn.; Jerry F. Carlin, Mound, Minn.

[73] Assignee: Eaton Corporation, Cleveland, Ohio

[21] Appl. No.: 09/109,248

[22] Filed: Jun. 30, 1998

[51] Int. Cl.⁶ .......................... F16K 31/40; F04B 49/035
[52] U.S. Cl. .................. 137/491; 251/30.02; 251/33; 417/307
[58] Field of Search .................................. 137/488, 489, 137/491, 565.33; 257/30.02, 33; 417/307, 440

[56] References Cited

U.S. PATENT DOCUMENTS

| | | | |
|---|---|---|---|
| 2,368,754 | 2/1945 | Ernst | 137/491 |
| 3,250,293 | 5/1966 | Adams et al. | 137/489 X |
| 3,457,941 | 7/1969 | Cook | 417/307 X |
| 3,752,174 | 8/1973 | Turolla | 137/491 |
| 3,903,919 | 9/1975 | Zeuner | 137/489 |
| 3,972,345 | 8/1976 | Court | 137/490 |
| 4,228,818 | 10/1980 | Nelson | 137/115 |
| 4,305,566 | 12/1981 | Grawunde | 137/491 X |
| 4,742,846 | 5/1988 | DiBartolo | 137/514.5 |
| 4,746,094 | 5/1988 | Cummins | 251/129.14 |
| 5,002,253 | 3/1991 | Kolchinsky et al. | 251/129.15 |
| 5,072,752 | 12/1991 | Kolchinsky | 137/491 X |
| 5,230,364 | 7/1993 | Leng et al. | 137/514 |
| 5,301,920 | 4/1994 | Ichiki | 137/491 X |
| 5,603,348 | 2/1997 | Geringer | 137/514.7 |
| 5,651,387 | 7/1997 | Thor | 137/454.2 |
| 5,860,797 | 1/1999 | Fujimura et al. | 417/307 X |

*Primary Examiner*—John Rivell
*Attorney, Agent, or Firm*—L. J. Kasper

[57] ABSTRACT

A pump assembly (33) including a cartridge valve assembly (39) having a poppet member (69) biased toward a closed position (FIG. 4) when a pilot portion (51) is closed, under the influence of an electromagnetic actuator (53), so that flow entering an inlet port (65) flows out an outlet opening (61). When the actuator (53) is not energized (FIG. 1), a pilot poppet (89) and armature (93) are biased to an open position (FIG. 5) by a pilot spring (94), so that fluid in the inlet port (65) flows through an orifice (71) in the poppet member (69) and through the pilot portion (51) to a system reservoir (R), creating a pressure differential across the poppet member (69), and opening a tank port (67). Flow is then from the inlet port (65) to the tank port (67), thus operating in a "bypass" mode. Under excessive inlet pressure, the pilot portion (51) also serves a pressure relief function.

9 Claims, 4 Drawing Sheets

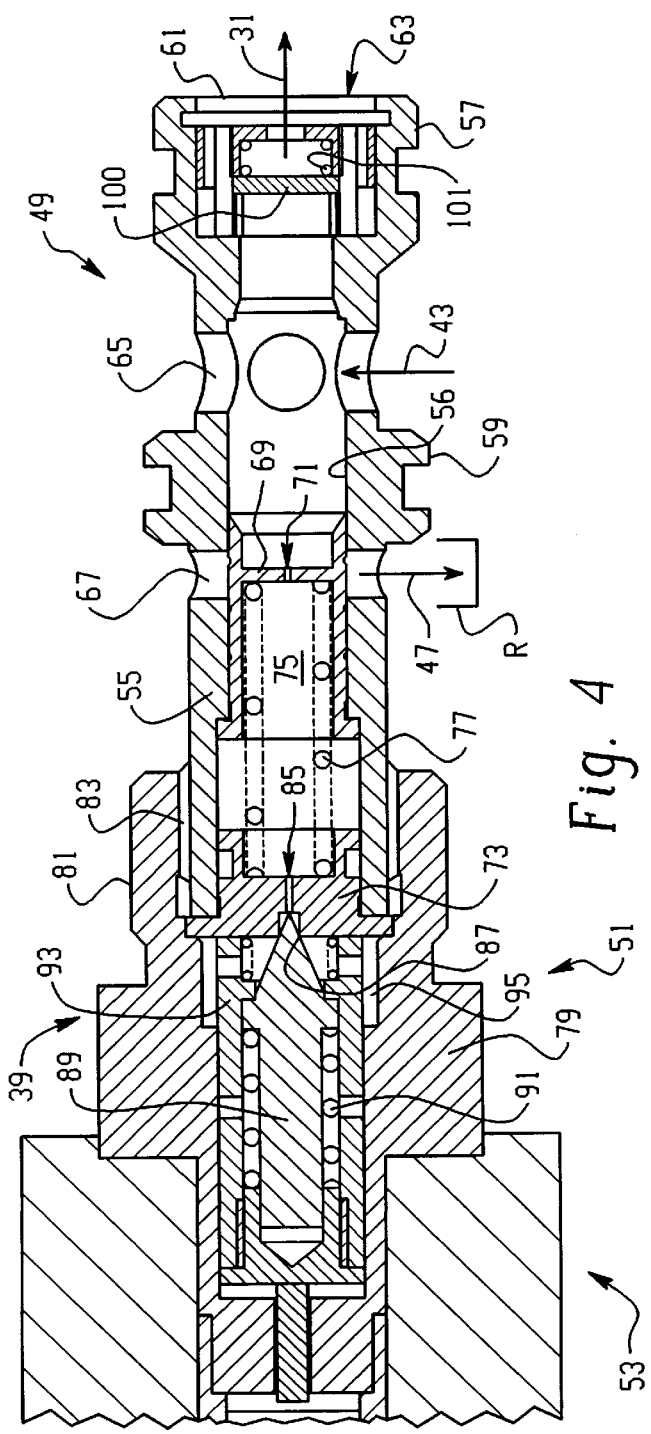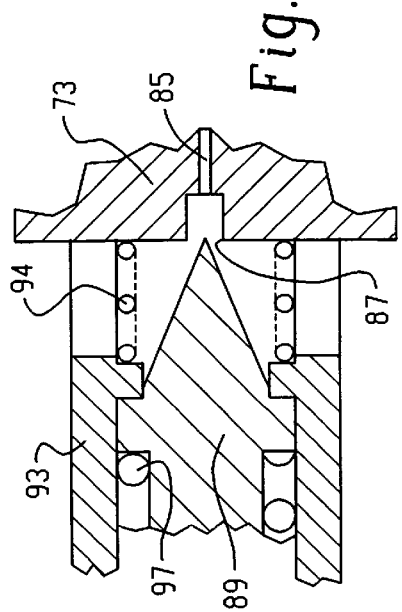

5,992,450

CARTRIDGE VALVE HAVING SOLENOID BYPASS AND INTEGRAL RELIEF VALVE

BACKGROUND OF THE DISCLOSURE

The present invention relates to a solenoid operated bypass valve and a relief valve, and more particularly, to a cartridge valve assembly including both the bypass valve and the relief valve.

It is well known to those skilled in the art to provide a hydraulic pump with some sort of valve arrangement, such as a bypass valve or an unloading valve, etc. whereby the output of the pump will be communicated to a fluid pressure actuated device under certain operating conditions, but will be diverted from the fluid pressure actuated device under certain other operating conditions. Typically, the fluid which is diverted from the pressure actuated device (i.e., a hydraulic motor, cylinder, etc.) is directed to the system reservoir, or back to the inlet of the pump, or to some other similar low pressure "source" of fluid.

An example of a system of the type described above is on a construction vehicle such as a skid steer loader which has, in addition to the hydraulically operated propel system, two or more hydraulically operated attachments, wherein at least one of the attachments requires a relatively low flow, and at least one of the attachments requires a relatively high flow.

In a known system, a primary pump is provided which alone can satisfy the needs of the low flow attachment. However, in order to meet the flow requirements of the high flow attachment, an auxiliary or secondary pump assembly is added to the vehicle, with the output of the auxiliary pump supplementing the flow output of the primary pump when the vehicle operator wishes to utilize the high flow attachment.

In order to keep such systems as simple as possible, it is necessary for the auxiliary pump assembly to be equipped with a bypass valve, a relief valve, and typically also a check valve to prevent "reverse" flow from the primary pump back through the secondary pump. Unfortunately, the addition of these various valve elements adds substantial cost to the secondary pump assembly, especially if each of the three valves mentioned is plumbed separately. The result may be a secondary pump assembly which is not economically feasible for a number of different vehicle applications.

For some vehicle applications, the auxiliary or secondary pump assembly is offered as a vehicle option, in the form of a "high flow kit", including the secondary pump and the associated valving. When the secondary pump is part of a kit, and is intended to be installed either by the vehicle dealer, or perhaps even by the ultimate customer, it is important for the kit to be as small and compact as possible, and involve as little plumbing as possible, thus minimizing the opportunity for assembly errors, leakage, etc.

BRIEF SUMMARY OF THE INVENTION

Accordingly, it is an object of the present invention to provide an improved pump assembly including a cartridge valve assembly having a solenoid operated bypass valve and a relief valve.

It is a more specific object of the present invention to provide such an improved pump assembly wherein the relief valve is integral with and forms part of the bypass valve, thus simplifying the cartridge valve assembly, and enabling it to be more compact.

The above and other objects of the invention are accomplished by the provision of a pump assembly comprising a housing defining an outlet port, a pumping element disposed within the housing and having a pump outlet passage. The housing defines a bore in open fluid communication with both the outlet port and the pump outlet passage. A cartridge valve assembly is disposed within the bore and is operable to control fluid communication between the pump outlet passage and the outlet port in response to changes in an electrical input signal.

The improved pump assembly is characterized by the cartridge valve assembly comprising an elongated valve body disposed in the housing bore, defining a body bore, and defining an outlet end including an outlet opening in fluid communication with the housing outlet port. A tank port provides fluid communication between the body bore and a source of low pressure fluid, and an inlet port provides fluid communication from the pump outlet passage to the body bore at a location intermediate the outlet opening and the tank port. A poppet member is disposed in the body bore and includes means biasing the poppet member to a first position blocking fluid communication from the body bore to the tank port. The valve body and the poppet member cooperate to define a pressure signal chamber biasing the poppet member toward the first position, the poppet member providing limited fluid communication between the inlet port and the pressure signal chamber. The cartridge valve assembly includes a pilot portion including a pilot poppet normally biased by a spring biasing means to an open position allowing fluid communication from the pressure signal chamber to the source of low pressure fluid. The cartridge valve assembly also includes an electromagnetic actuator portion including an armature portion adapted to move the pilot poppet, in opposition to the force of the spring biasing means between the open position and a closed position in response to the electrical input signal varying between a first condition and a second condition, respectively.

When the electrical input signal is in the first condition, the pressure signal chamber is drained to the source of low pressure fluid, and flow is from the inlet port to the tank port. When the electrical input signal is in the second condition, and pressure at the inlet port is below a predetermined relief pressure, the pilot poppet is in the closed position, and flow is from the inlet port to the outlet opening. When the electrical input signal is in the second condition and pressure at the inlet port is above the predetermined relief pressure, pressure in the pressure signal chamber moves the pilot poppet to the open position in opposition to the force of a relief biasing spring, the pressure signal chamber is drained to the source of low pressure fluid, and flow is permitted from the inlet port to the tank port.

BRIEF DESCRIPTION OF THE DRAWINGS

FIG. 4 is an axial cross-section of the cartridge valve assembly shown in external view in FIG. 3.

FIG. 5 is an enlarged, fragmentary axial cross-section, similar to FIG. 4, illustrating the pilot poppet in its open position.

DETAILED DESCRIPTION OF THE PREFERRED EMBODIMENT

Figure 1:
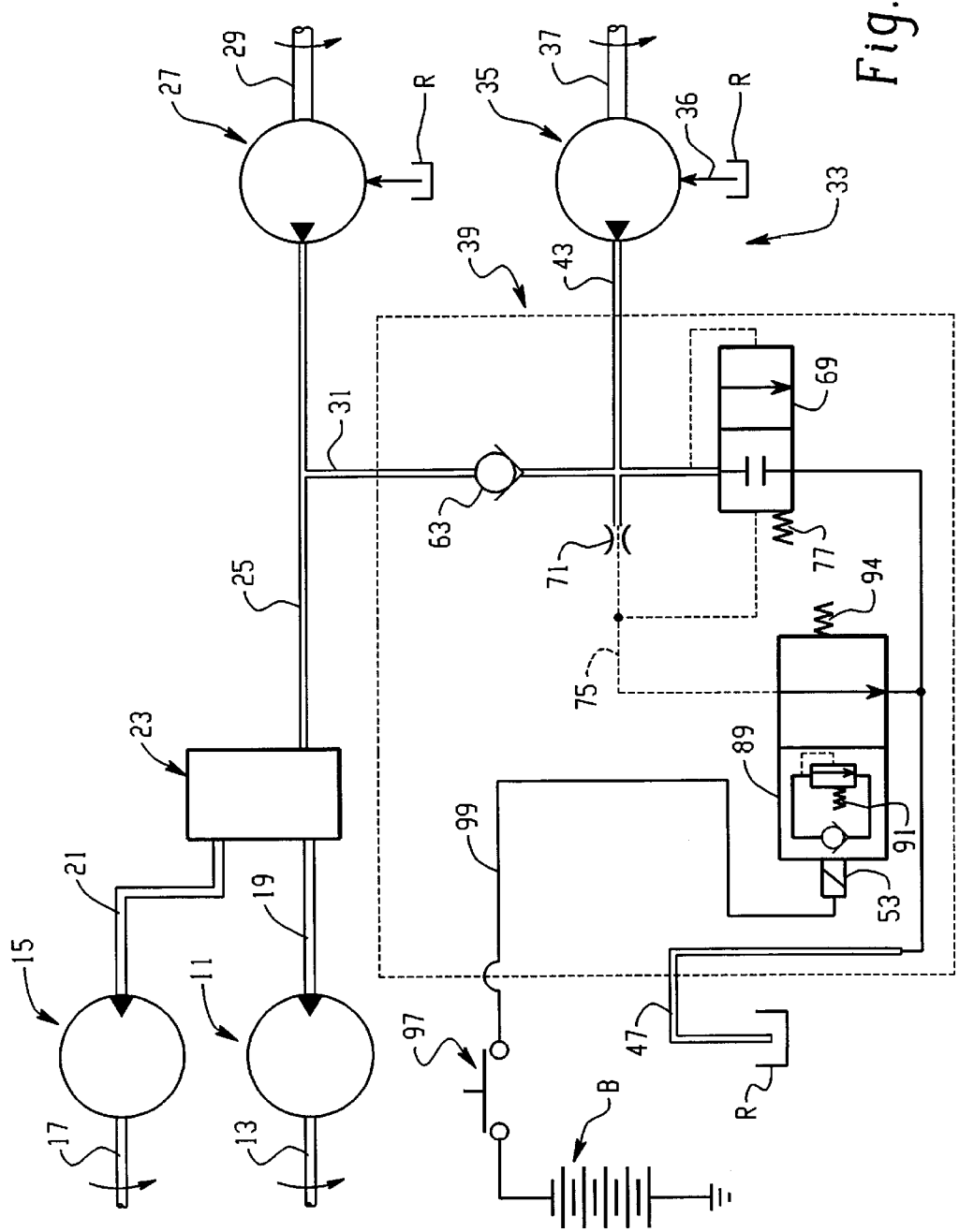
FIG. 1 is a hydraulic schematic of a typical vehicle hydraulic circuit of the type with which the present invention may be utilized.

Referring now to the drawings, which are not intended to limit the invention, FIG. 1 is a hydraulic schematic of a vehicle hydraulic circuit of the type which may utilize the present invention.

In the system of FIG. 1, a "low flow" vehicle attachment or implement is represented schematically as a rotary hydraulic motor 11 having an output shaft 13, while a "high flow" vehicle attachment or implement is represented schematically as a rotary hydraulic motor 15 having an output shaft 17. The motors 11 and 15 receive pressurized fluid by means of conduits 19 and 21, respectively from a valve assembly 23, which is typically a manually actuatable valve assembly, by means of which the vehicle operator can select either the low flow motor 11 or the high flow motor 15, in a manner well known to those skilled in the art. It should be understood that the valve assembly 23 may be conventional, forms no part of the present invention, and will not be described further herein.

Figure 2:
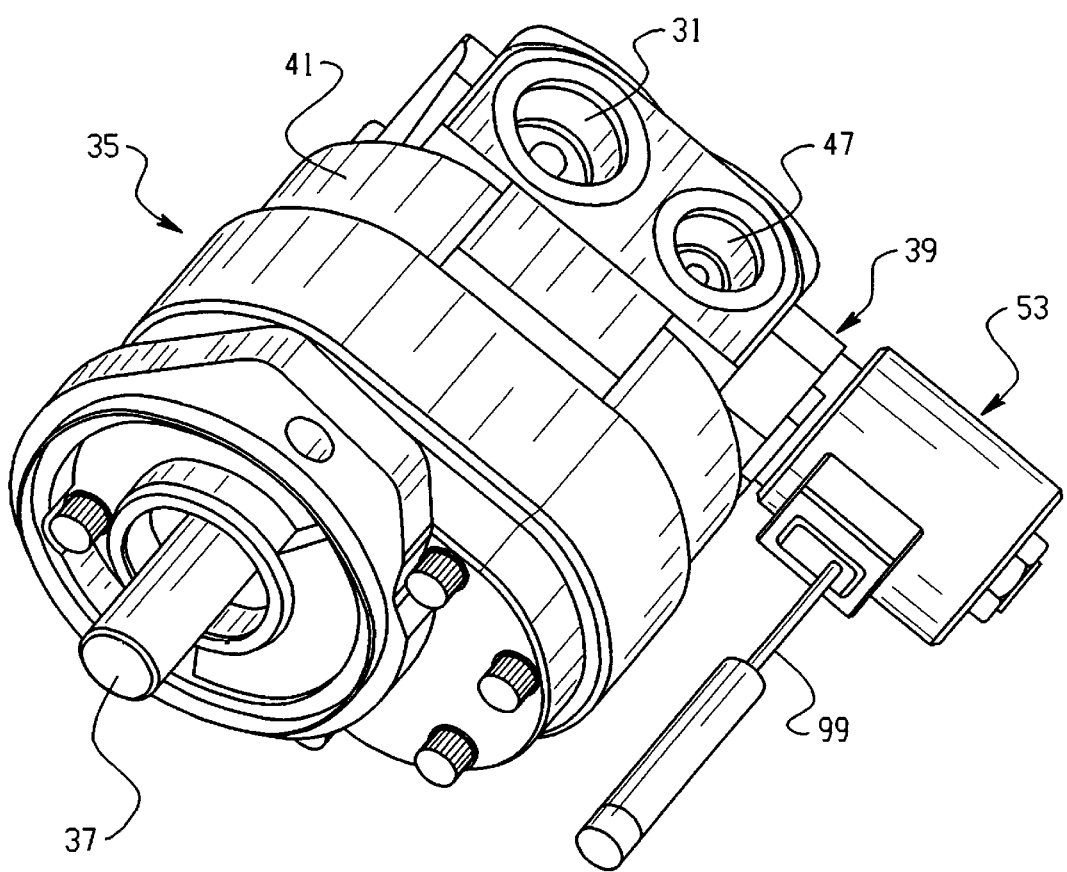
FIG. 2 is a perspective view of the auxiliary pump assembly shown schematically in FIG. 1.

Pressurized fluid is communicated to the valve assembly 23 by means of a conduit 25, from a primary pump 27, driven by an input shaft 29. Teed into the conduit 25 is a conduit 31 which is the output from a "high flow" pump assembly, generally designated 33. The pump assembly 33, shown in perspective view in FIG. 2, comprises a secondary pump 35, driven by an input shaft 37, and a cartridge valve assembly, generally designated 39. As is shown only in FIG. 1, and only schematically, the secondary pump 35 receives fluid from a pump inlet passage 36, which is typically in fluid communication with a system reservoir R.

Figure 3:
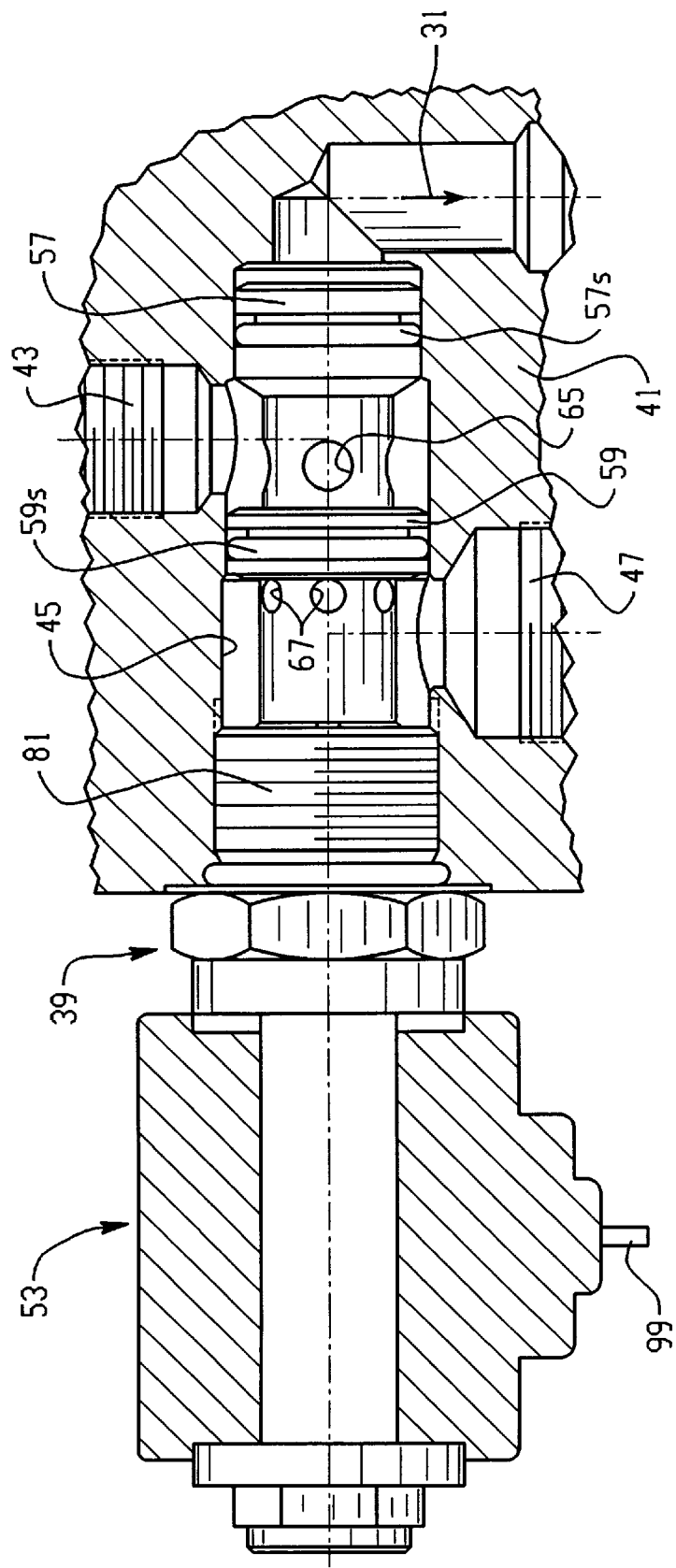
FIG. 3 is a transverse cross-section through the auxiliary pump assembly of FIG. 2 generally illustrating the cartridge valve assembly which comprises a key feature of the present invention.

Referring now primarily to FIGS. 3 and 4, but in conjunction with FIG. 1, the secondary pump 35 includes a pump housing 41 defining a pump outlet passage 43, and further defining a housing bore 45. The housing 41 also defines a passage 47 which is shown schematically in FIG. 1 as being in communication with the system reservoir R although, typically, the passage 47 would communicate back to the pump inlet passage 36 of the secondary pump 35. Thus, the housing bore 45 is in open communication with the conduit 31, the pump outlet passage 43, and the passage 47.

Disposed within the housing bore 45 is the cartridge valve assembly 39, which, as is best seen in FIG. 4, may generally be viewed as comprising a poppet portion 49, a pilot portion 51, and an electromagnetic actuator portion 53. In the subject embodiment, and by way of example only, the poppet portion 49 and pilot portion 51 are disposed within the housing 41, while the actuator portion 53 is disposed external to the housing 41.

Referring now primarily to FIG. 4, the poppet portion 49 comprises an elongated valve body 55, including a pair of enlarged portions 57 and 59, which are adapted to include O-ring seals 57s and 59s, respectively, in engagement with the inside surface of the housing bore 45 (see FIG. 3), thus isolating the conduit 31, the pump outlet passage 43 and the passage 47 from each other. The enlarged portion 57 comprises an outlet end of the valve body and includes an outlet opening 61 in open communication with the conduit 31. Disposed within the opening 61 is a check valve assembly, generally designated 63 (see FIG. 1), the function of which will be described subsequently.

The valve body 55 defines an inlet port 65, shown herein as comprising a series of circumferentially spaced radial bores. The valve body 55 also defines a tank port 67 which may similarly comprise a series of circumferentially spaced bores. Disposed within valve body 55 is a poppet member 69 defining a small fluid orifice 71, the function of which will be described subsequently.

At the left end in FIG. 4 of the valve body 55 is a spring seat member 73 which cooperates with the valve body 55 to define a pressure signal chamber 75. Disposed within the chamber 75 is a helical compression spring 77, the function of which is to bias the poppet member 69 toward the closed position shown in FIG. 4, blocking fluid communication from the inlet port 65 to the tank port 67.

The pilot portion 51 comprises a fitting 79 which defines a set of external threads 81 in threaded engagement with the pump housing 41 (see FIG. 3 also). The fitting 79 also defines a set of internal threads which are in engagement with an externally threaded portion 83 of the valve body 55, such that the valve body 55 is threaded tightly into the fitting 79, trapping a flange of the spring seat member 73 therebetween.

The spring seat member 73 defines a small pilot passage 85 which, at its left end in FIG. 4, is somewhat enlarged and defines a poppet seat 87. Slidably disposed within the fitting 79 is a sleeve member 93, and disposed therein is a pilot poppet 89, normally biased by a biasing spring 91 toward the right in FIG. 4, into engagement with a shoulder on the sleeve member 93 (as better seen in FIG. 5). The entire sub-assembly of the pilot poppet 89, the spring 91, and the sleeve member 93 is biased to the left in FIGS. 4 and 5 by a pilot spring 94.

In accordance with one important aspect of the present invention, the pilot poppet 89 serves a dual function. It is both a pilot valve, to control the pressure in the pressure signal chamber 75, and it is also a pressure relief valve (see FIG. 1). This dual function will be described in greater detail in connection with the subsequent description of the operation of the present invention.

The sleeve member 93 is spaced apart axially from the left end surface of the spring seat member 73 to define an opening into an annular chamber 95. The chamber 95 is in fluid communication with the passage 47 through openings (not seen in FIG. 4) of the flange of the spring seat member 73 and a passage across the threads 83. Therefore, any fluid flowing through the chamber 95 will eventually flow to the passage 47, and from there to either the system reservoir, or back to the inlet side of the secondary pump 35, as was described previously.

Referring again primarily to FIG. 1, the vehicle operator is able to control the operation of the cartridge valve assembly 39 by means of a manual switch 97, which is schematically shown as open in FIG. 1. Preferably, the manual switch 97 may be actuated to transmit an electrical signal from a source of electrical energy, such as the vehicle battery B to the electromagnetic actuator 53 over a signal line 99. As may best be seen in FIG. 2, the signal line 99 (electrical input signal) may be transmitted to the actuator 53 by means of a typical wiring harness, which also bears the reference numeral "99".

Operation

Referring now primarily to FIGS. 1 and 4, if the vehicle operator wishes to operate only the low flow motor 11, it is necessary to shift the valve assembly 23 to its "low flow" position, and move the manual switch 97 to the open position shown in FIG. 1. With no electrical input signal 99 being transmitted to the actuator 53, the pilot poppet 89 will remain in the open position away from the seat 87, biased by the pilot spring 94, as shown in FIG. 5. In the condition described, as pressurized fluid enters the valve body 55 through the inlet port 65, pressure upstream of the fluid orifice 71 will be greater than that downstream of the orifice 71, and the poppet member 69 will be moved to the left in FIG. 4, to the open position, in opposition to the compression spring 77, uncovering the tank ports 67. Therefore, substantially all fluid entering the inlet ports 65 will flow out of the tank ports 67, this condition thus being referred to as the "bypass" mode.

If the vehicle operator now wishes to operate the high flow motor 15, it is necessary to shift the valve assembly 23 to its "high flow" position, and move the manual switch 97 to the closed position. With the switch 97 closed, the actuator 53 is energized, and the pilot poppet 89 and sleeve member 93 are moved to the closed position shown in FIG. 4, in opposition to the force of the pilot spring 94, to engage the seat 87. Thus, the sleeve member 93 may also be considered an "armature" in relationship to the actuator 53, in the sense that the electromagnetic lines of flux from the actuator 53 will pass through the sleeve member 93, moving the sleeve member 93 in opposition to the force of the pilot spring 94. With flow through the pilot passage 85 being blocked, the fluid pressures upstream and downstream of the orifice 71 will equalize, allowing the spring 77 to force the poppet 69 to the right in FIG. 4, closing off the tank ports 67. Thus, substantially all fluid from the secondary pump 35 entering from the pump outlet passage 43 will flow to the right in FIG. 4 past the check valve assembly 63 and through the conduit 31, such that the output flow of the secondary pump 35 joins the output flow of the primary pump 27 in the valve assembly 23, then actuates the high flow motor 15.

In order to protect the high flow pump assembly 33 from an excessive pressure condition, there must be some sort of relief valve provided in the circuit. In accordance with one important aspect of the present invention, while the system is operating the high flow motor 15, if the fluid pressure in the pump outlet passage 43 becomes excessive, that same pressure is present in the pressure signal chamber 75, and acts on the small surface of the pilot poppet 89 which is disposed radially inward of the poppet seat 87. As the fluid pressure exceeds a predetermined maximum pressure, the force on the pilot poppet 89 overcomes the biasing force of the spring 91, lifting the pilot poppet 89 off the shoulder of the sleeve member 93, while the sleeve member 93 remains stationary under the influence of the electromagnetic field of the actuator 53. At the same time, the pilot poppet 89 is lifted off the poppet seat 87. Therefore, the spring 91 may be referred to as a "relief" spring. As a result of the pressure overcoming the relief spring 91, the pressure in the signal chamber 75 is drained to tank, and because the fluid orifice 71 is relatively small, a substantial pressure differential will exist across the poppet member 69, biasing it to the left in FIG. 4 in opposition to the force of the spring 77, and uncovering the tank ports 67. As is well known to those skilled in the relief valve art, it is likely that the above-described movement of the poppet member 69 will not completely uncover the tank ports 67, but instead, will be in a position to meter flow from the inlet ports 65 to the tank ports 67, to maintain the pressure somewhat below the predetermined maximum pressure.

It should be understood by those skilled in the art that the cartridge valve assembly 39 of the present invention may also be utilized in a system including only a single pump, in which the assembly 39 performs the same functions as those described above, but not in conjunction with another pump. In such an application of the invention, there is no need for the check valve assembly 63, the only function of which is to prevent back-flow from the primary pump 27 into the outlet opening 61 of the cartridge valve 39.

Although the present invention has been illustrated and described as being part of a pump assembly, it should be understood that the invention is not so limited. By way of example only, the cartridge valve assembly 39 could be installed into some sort of manifold assembly, to be located remotely from the pump with which it operates.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A pump assembly comprising a housing defining an outlet port, a pumping element disposed within said housing and having a pump outlet passage; said housing defining a bore in open fluid communication with both said outlet port and said pump outlet passage; a cartridge valve assembly disposed within said bore and operable to control fluid communication between said pump outlet passage and said outlet port in response to changes in an electrical input signal; characterized by:

(a) said cartridge valve assembly comprising an elongated valve body disposed in said housing bore, defining a body bore and defining an outlet end including an outlet opening in fluid communication with said housing outlet port, a tank port providing fluid communication between said body bore and a source of low pressure fluid, and an inlet port providing fluid communication from said pump outlet passage to said body bore at a location intermediate said outlet opening and said tank port;

(b) a poppet member disposed in said body bore and including means biasing said poppet member to a first position blocking fluid communication from said body bore to said tank port;

(c) said valve body and said poppet member cooperating to define a pressure signal chamber biasing said poppet member toward said first position, said poppet member providing limited fluid communication between said inlet port and said pressure signal chamber;

(d) said cartridge valve assembly including a pilot portion including a pilot poppet normally biased by spring biasing means to an open position allowing fluid communication from said pressure signal chamber to said source of low pressure fluid, and an electromagnetic actuator portion including an armature portion adapted to move said pilot poppet, in opposition to the force of said spring biasing means, between said open position and a closed position in response to said electrical input signal varying between a first condition and a second condition, respectively;

(e) whereby:

(1) when said electrical input signal is in said first condition, said pressure signal chamber is drained to said source of low pressure fluid, and flow is from said inlet port to said tank port;

(2) when said electrical input signal is in said second condition, and pressure at said inlet port is below a predetermined relief pressure, said pilot poppet is in said closed position; and flow is from said inlet port to said outlet opening; and (3) when said electrical input signal is in said second condition, and pressure at said inlet port is above said predetermined relief pressure, pressure in said pressure signal chamber moves said pilot poppet to said open position in opposition to the force of a relief biasing spring, said pressure signal chamber is drained to said source of low pressure fluid, and flow is permitted from said inlet port to said tank port.

2. A pump assembly as claimed in claim 1, characterized by said outlet end of said valve body including check valve means permitting fluid flow only from said inlet port through said body bore and out said outlet opening.

3. A pump assembly as claimed in claim 1, characterized by said elongated valve body including first sealing means operable to seal within said housing bore axially between said inlet port and said outlet opening, and second sealing means operable to seal within said housing bore axially between said inlet port and said tank port.

4. A pump assembly as claimed in claim 1, characterized by said pumping element having a pump inlet passage, and said tank port defined by said valve body being in open fluid communication with said pump inlet passage.

5. A pump assembly as claimed in claim 1, characterized by said poppet member and said pressure signal chamber being disposed axially between said inlet port and said pilot portion, and said electromagnetic actuator portion being disposed external to said housing of said pump assembly.

6. A pump assembly as claimed in claim 1, characterized by said armature portion comprising a generally cylindrical sleeve member defining a shoulder, said pilot poppet being disposed within said cylindrical sleeve member, and biased toward engagement with said shoulder by said relief biasing spring.

7. A pump assembly as claimed in claim 6, characterized by said spring biasing means which biases said pilot poppet toward said open position engages and biases said generally cylindrical sleeve member.

8. A cartridge valve assembly adapted to be disposed within a bore of a housing, and operable to control fluid communication between an outlet passage and an outlet port in response to changes in an electrical input signal; characterized by:

(a) said cartridge valve assembly comprising an elongated valve body disposed in said housing bore, defining a body bore and defining an outlet end including an outlet opening in fluid communication with said outlet port, a tank port providing fluid communication between said body bore and a source of low pressure fluid, and an inlet port providing fluid communication from said outlet passage to said body bore at a location intermediate said outlet opening and said tank port;

(b) a poppet member disposed in said body bore and including means biasing said poppet member to a first position blocking fluid communication from said body bore to said tank port;

(c) said valve body and said poppet member cooperating to define a pressure signal chamber biasing said poppet member toward said first position, said poppet member providing limited fluid communication between said inlet port and said pressure signal chamber;

(d) said cartridge valve assembly including a pilot portion including a pilot poppet normally biased by spring biasing means to an open position allowing fluid communication from said pressure signal chamber to said source of low pressure fluid, and an electromagnetic actuator portion including an armature portion adapted to move said pilot poppet, in opposition to the force of said spring biasing means, between said open position and a closed position in response to said electrical input signal varying between a first condition and a second condition, respectively;

(e) whereby:
  (1) when said electrical input signal is in said first condition, said pressure signal chamber is drained to said source of low pressure fluid, and flow is from said inlet port to said tank port;
  (2) when said electrical input signal is in said second condition, and pressure at said inlet port is below a predetermined relief pressure, said pilot poppet is in said closed position; and flow is from said inlet port to said outlet opening; and
  (3) when said electrical input signal is in said second condition, and pressure at said inlet port is above said predetermined relief pressure, pressure in said pressure signal chamber moves said pilot poppet to said open position in opposition to the force of a relief biasing spring, said pressure signal chamber is drained to said source of low pressure fluid, and flow is permitted from said inlet port to said tank port.

9. A valve assembly as claimed in claim 8, characterized by said outlet end of said valve body including check valve means permitting fluid flow only from said inlet port through said body bore and out said outlet opening.

* * * * *